US005573190A

United States Patent [19]
Goossen

[11] Patent Number: 5,573,190
[45] Date of Patent: Nov. 12, 1996

[54] METHOD AND APPARATUS FOR SHREDDING A LARGE BALE

[75] Inventor: Louis Goossen, Beatrice, Nebr.

[73] Assignee: Goossen Industries & Construction, Beatrice, Nebr.

[21] Appl. No.: 387,022

[22] Filed: Feb. 10, 1995

[51] Int. Cl.⁶ .................................................. B02C 23/02
[52] U.S. Cl. ........................ 241/27; 241/33; 241/186.4; 241/605
[58] Field of Search ................................. 241/282, 605, 241/186.4, 27, 186.3, 33

[56] References Cited

U.S. PATENT DOCUMENTS

| | | | |
|---|---|---|---|
| 3,580,517 | 5/1971 | Ehrlich | 241/186.4 |
| 3,589,627 | 6/1971 | Torrence | 241/186.4 |
| 4,101,081 | 7/1978 | Ritter et al. | 241/101.7 |
| 4,376,607 | 3/1983 | Gibson | 414/24.6 |
| 4,390,312 | 6/1983 | Skeem | 414/24.6 |
| 4,448,361 | 5/1984 | Marcy | 241/101.7 |
| 4,449,672 | 5/1984 | Morlock et al. | 241/101.7 |
| 4,524,916 | 6/1985 | Keyes et al. | 241/101 A |
| 4,538,948 | 9/1985 | Melton | 414/24.6 |
| 4,597,703 | 7/1986 | Bartolini | 414/24.6 |
| 4,621,776 | 11/1986 | Hostetler | 241/101.7 |
| 4,623,099 | 11/1986 | Vosbein et al. | 241/101 A |
| 4,643,364 | 2/1987 | Lucas | 241/55 |
| 4,657,191 | 4/1987 | Dwyer et al. | 241/101.7 |
| 4,778,322 | 10/1988 | Stronski | 414/24.6 |
| 4,779,810 | 10/1988 | Frey | 241/101 A |
| 4,787,797 | 11/1988 | Harper | 414/24.6 |
| 4,789,289 | 12/1988 | Wilson | 414/24.6 |
| 4,790,489 | 12/1988 | Paul | 241/101 A |
| 4,830,292 | 5/1989 | Frey | 241/101 A |
| 4,852,816 | 8/1989 | Doppstadt | 241/101.7 |
| 4,892,259 | 1/1990 | von der Heide | 241/101.7 |
| 4,923,128 | 5/1990 | Ostrowski | 241/101.7 |
| 4,982,658 | 1/1991 | Knudson | 100/7 |
| 5,025,992 | 6/1991 | Niebur | 241/101.7 |
| 5,033,683 | 7/1991 | Taylor | 241/101 A |
| 5,071,079 | 12/1991 | Fykse et al. | 241/101 A |
| 5,154,363 | 10/1992 | Eddy | 241/30 |
| 5,181,663 | 1/1993 | Dorscht et al. | 241/81 |
| 5,203,658 | 4/1993 | Henderson | 414/24.6 |
| 5,205,496 | 4/1993 | O'Donnell et al. | 241/34 |
| 5,209,412 | 5/1993 | Dwyer et al. | 241/101.7 |
| 5,209,413 | 5/1993 | Dwyer et al. | 241/101.7 |
| 5,211,345 | 5/1993 | Siebenga | 241/101.7 |
| 5,215,266 | 6/1993 | Zimmerman | 241/101.7 |
| 5,255,867 | 10/1993 | Whittleton et al. | 214/101.7 |

*Primary Examiner*—John M. Husar
*Attorney, Agent, or Firm*—Wood, Phillips, VanSanten, Clark & Mortimer

[57] ABSTRACT

A bale shredder for shredding a large bale of forage, bedding, or mulching material is provided wherein a cutter is mounted to a frame for moving with a cutting action for shredding a bale. Further, an oscillating carriage is mounted to the frame for oscillating the bale across the cutter to induce an additional cutting action on the bale by the cutter.

15 Claims, 4 Drawing Sheets

5,573,190

1

METHOD AND APPARATUS FOR SHREDDING A LARGE BALE

FIELD OF THE INVENTION

This invention relates to the shredding of baled material and, more particularly, to the shredding of a large bale of forage, bedding or mulching material.

BACKGROUND OF THE INVENTION

Currently, a large percentage of all hay, straw, and residual crop material is put up for storage in what are commonly referred to as large bales, having either a round or square shape. Eventually, these bales must be removed from storage, shredded, and then dispensed as livestock feed, bedding material, or landscape mulch. However, these large bales form a tough mass of material, and efforts to devise efficient methods and apparatus for shredding and dispensing the bales have met with limited success.

One problem with current apparatus is a tendency to shred or grind the baled material to too fine of a consistency, thereby limiting its usefulness for both feeding and mulching, and requiring an unnecessarily large amount of horsepower. Another problem with current apparatus is the inability to effectively adjust and control the dispensing rate of the shredded bale material and the consistency of the shredded bale material. Yet another problem with current apparatus is an inherently slow dispensing rate of the shredded bale material, due to the cutting method employed by the equipment. A further problem with current apparatus is the inability to compensate for variations in the consistency and toughness from one bale to another.

In particular, there is a lack of efficient and effective apparatus for dispensing a large bale for use as landscape mulch. The consistency of the shredded bale material and the dispensing rate of the shredded bale material are particularly important for landscape mulching. Dispensed bale material that is shredded to too fine or too heavy of a consistency has limited effectiveness as landscape mulch. It is desirable for the shredded bale material to consist essentially of separated, relatively long fibers which are capable of being partially embedded in the soil during follow-up disk operations. Additionally, the square footage of the area being mulched can vary greatly from job to job; thus, it is desirable to optimize the mulching operation by adjusting the dispensing rate of the shredded bale material to compensate for the size of the area being mulched. Both the consistency and the dispensing rate of the shredded bale material can be affected by the toughness and consistency of the particular bale being dispensed. It is desirable to compensate for variations in consistency and toughness from one bale to another so that the consistency and dispensing rate of the shredded bale material remain at optimum values.

There is a need for a new and effective method and apparatus for shredding and distributing large bales that is directed toward overcoming one or more of the problems discussed above.

SUMMARY OF THE INVENTION

In accordance with the present invention, a method of shredding a large bale of forage, bedding, or mulching material is provided wherein a bale cutting tool is moved in a cutting action to shred a bale, and the bale is oscillated relative to the cutting tool to induce an additional cutting action as the cutting tool shreds the bale.

According to the present invention, a bale shredder for shredding a large bale of forage, bedding, or mulching material is provided wherein a cutter is mounted to a frame for moving with a cutting action for shredding a bale. Further, an oscillating carriage is mounted to the frame for oscillating the bale across the cutter to induce an additional cutting action on the bale by the cutter.

In a preferred embodiment, the cutter is a cutting rotor mounted to the frame for rotation about a rotor axis for shredding the bale. The carriage oscillates the bale parallel to the rotor axis, thereby inducing a cross-cutting action where the bale is cut in a first plane due to the rotation of the cutting rotor about the rotor axis and in a second plane due to the oscillation of the bale parallel to the rotor axis.

Another feature is the provision of a bale conveyor mounted on the carriage for conveying the bale into the cutter as the bale is oscillated across the cutter.

Additionally, the rate at which the bale is fed into the cutter, the rate at which the bale is oscillated, and the speed of the cutter are all individually adjustable to compensate for the consistency of the bale, the desired consistency of the shredded bale material, and the desired rate of distribution for the shredded bale material.

The present invention provides an effective adjustable method and apparatus for shredding and dispensing a large bale. The dispensing rate of the shredded bale material may be adjusted over a range of dispensing rates from a relatively high dispensing rate to a relatively low dispensing rate. The consistency of shredded bale material can be adjusted over a range of consistencies from a heavy consistency to a fine consistency. The consistency and the dispensing rate of the shredded bale material can be maintained at optimum values regardless of variation in consistency and toughness from one bale to another.

Other objectives, features and advantages of the invention will be apparent from the following detailed description taken in conjunction with the accompanying drawings.

BRIEF DESCRIPTION OF THE DRAWINGS

The features of this invention which are believed to be novel are set forth with particularity in the appended claims. The invention, together with its objectives and advantages thereof, may best be understood by reference to the following description taken in conjunction with the accompanying drawings, in which like reference numerals identify like elements in the figures and in which:

DETAILED DESCRIPTION OF THE DRAWINGS

Figure 1:
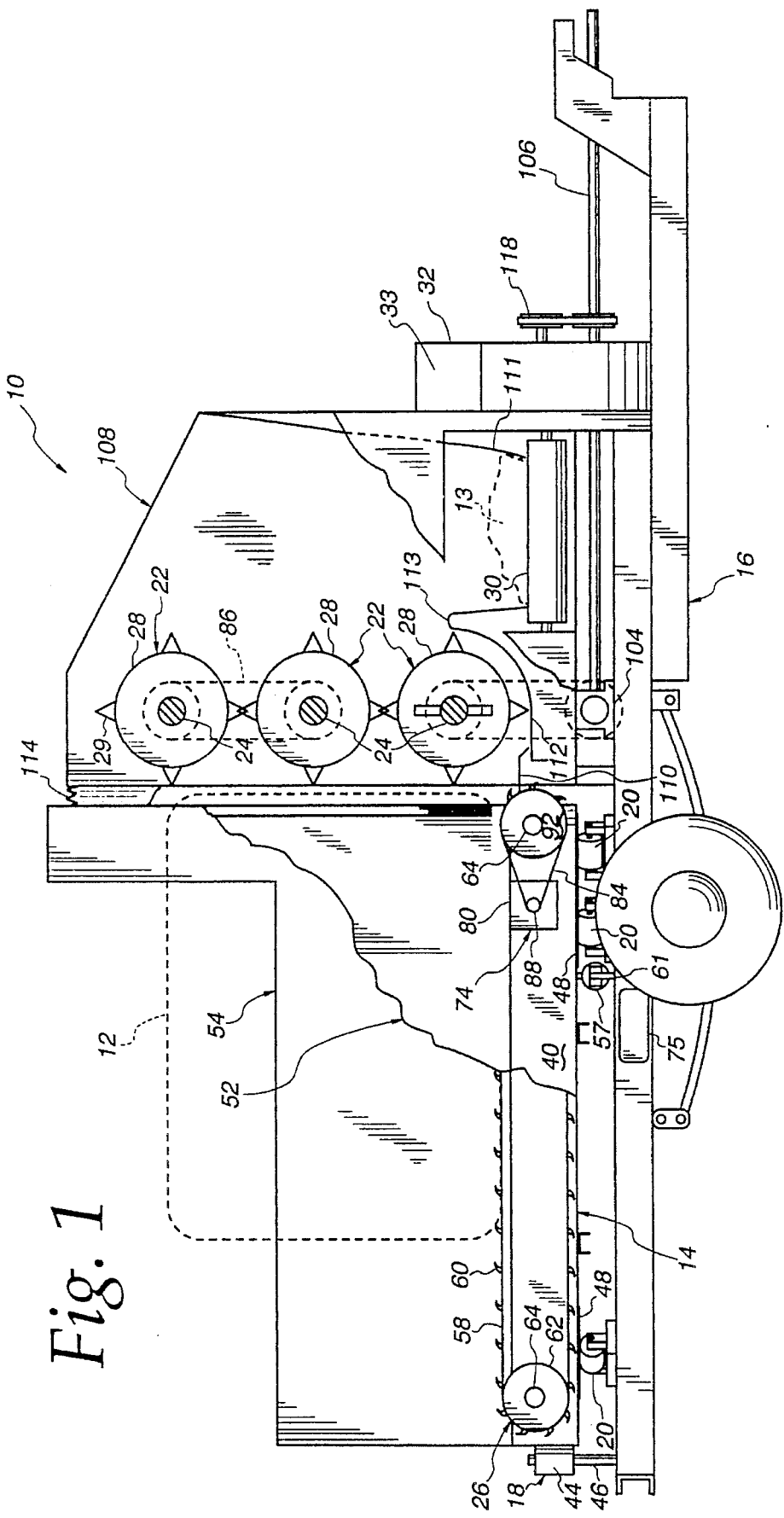
FIG. 1 is a side elevational view of a large bale shredder embodying the present invention.
Figure 3:
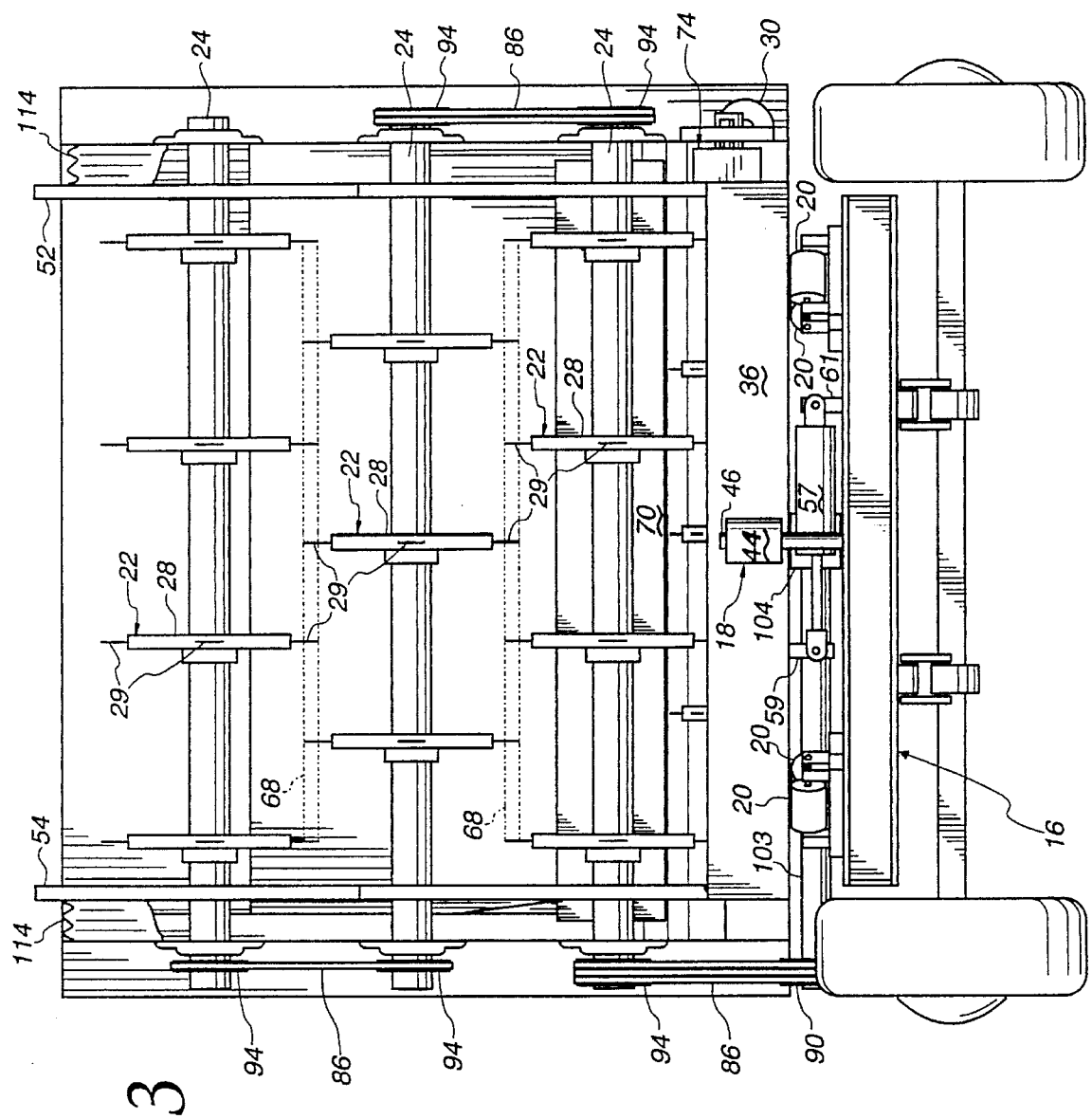
FIG. 3 is an end elevational view of the bale shredder from the left in FIGS. 1 and 2.

A large bale shredder 10 oscillates a large bale 12 with a carriage 14 mounted to a towable frame 16 by a pivot 18 and a plurality of rollers 20, as seen in FIG. 1. The carriage 14 oscillates the bale 12 back and forth across a plurality of axially spaced, disk-shaped cutting rotors 22 rotatably mounted to the frame 16 on elongated rotor shafts 24, as best seen in FIG. 3. A bale conveyor 26 is mounted on the carriage 14 for moving the bale 12 into the cutting rotors 22 as the bale 12 is oscillated by the carriage 14.

Figure 2:
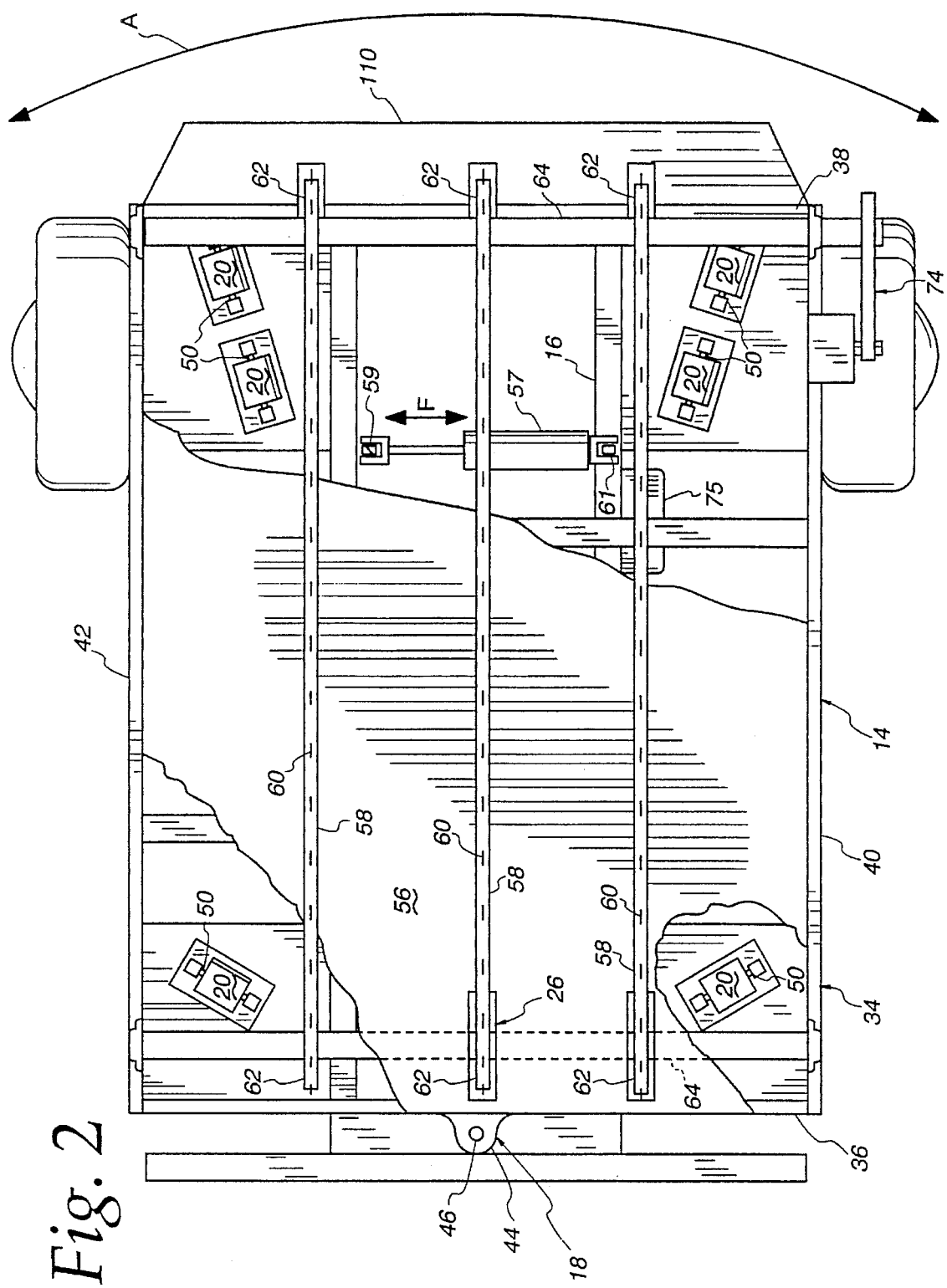
FIG. 2 is a top plan view of the bale shredder shown in FIG. 1 with elements broken away for clarity.

The pivoting, oscillating movement of the carriage 14 and of the bale 12 across the cutting rotors 22 is illustrated by line A, shown in FIG. 2. Each cutting rotor 22 induces a cutting action on the bale 12 in a vertical plane as the cutting rotor 22 is rotated. The carriage 14 induces a second cutting action by each of the cutting rotors 22 on the bale 12 in a horizontal plane as the bale 12 is oscillated across the cutting rotors 22. Thus, a dual cutting action is induced on the bale 12 by the cutting rotors 22 and the carriage 14 to produce shredded bale material 13.

This dual cutting action has proven to be very effective at shredding large bales without requiring the relatively large amounts of horsepower required by current apparatus. Further, the dual cutting action has proven ideal for producing shredded bale material 13 having the separated, long fiber consistency that is optimal for landscape mulching.

The oscillation of the bale 12 across the cutting rotors 22 also ensures that the entire face of the bale 12 will be cut by the cutting rotors 22 as the face is oscillated across the cutting rotors 22. This allows for the use of a rotating cutter that is discontinuous along its rotating axis, as embodied by the axially spaced cutting rotors 22 on the rotor shaft 24. The axial spacing provides large areas for the shredded material to pass through as the bale 12 is being shredded. This, in turn, allows for the bale 12 to be fed at a higher rate than would be possible with rotating cutters that are continuous along the rotating axis, such as rotating cylinders having cutting knives spaced thereon. Further, the axial spacing of the cutting rotors 22 allows the cutting rotors to make relatively deep cuts into the bale 12 as it is fed into and across the cutting rotors 22. Again, such deep cuts would not be possible with a continuous rotating cutter such as cylinder, because the continuous surface of the cylinder would inhibit penetration into the bale.

It will be appreciated, that while the pivoting, oscillating motion of the bale 12 induced by the carriage 14 has proven to be quite effective, other forms of oscillation which produce dual cutting action are encompassed by the present invention. For example, the carriage 14 could simply translate linearly back and forth across the cutting rotors 22 to shred the bale 12. Likewise, while the horizontal mounting of the rotor shafts 24 and the parallel, horizontal oscillation of the bale 12 has proven to be very successful, other orientations of the cutting rotors 22 and oscillation of the bale 12 are also encompassed by the present invention. For example, the rotor shafts 24 could be mounted vertically and the carriage 14 could oscillate the bale 12 up and down across the cutting rotors 22 which would be rotating in horizontal planes.

Because the bale shredder 10 does not require the rotation of a bale 12 about its own axis, the bale shredder 10 is equally effective for shredding square or round bales.

Figure 4:
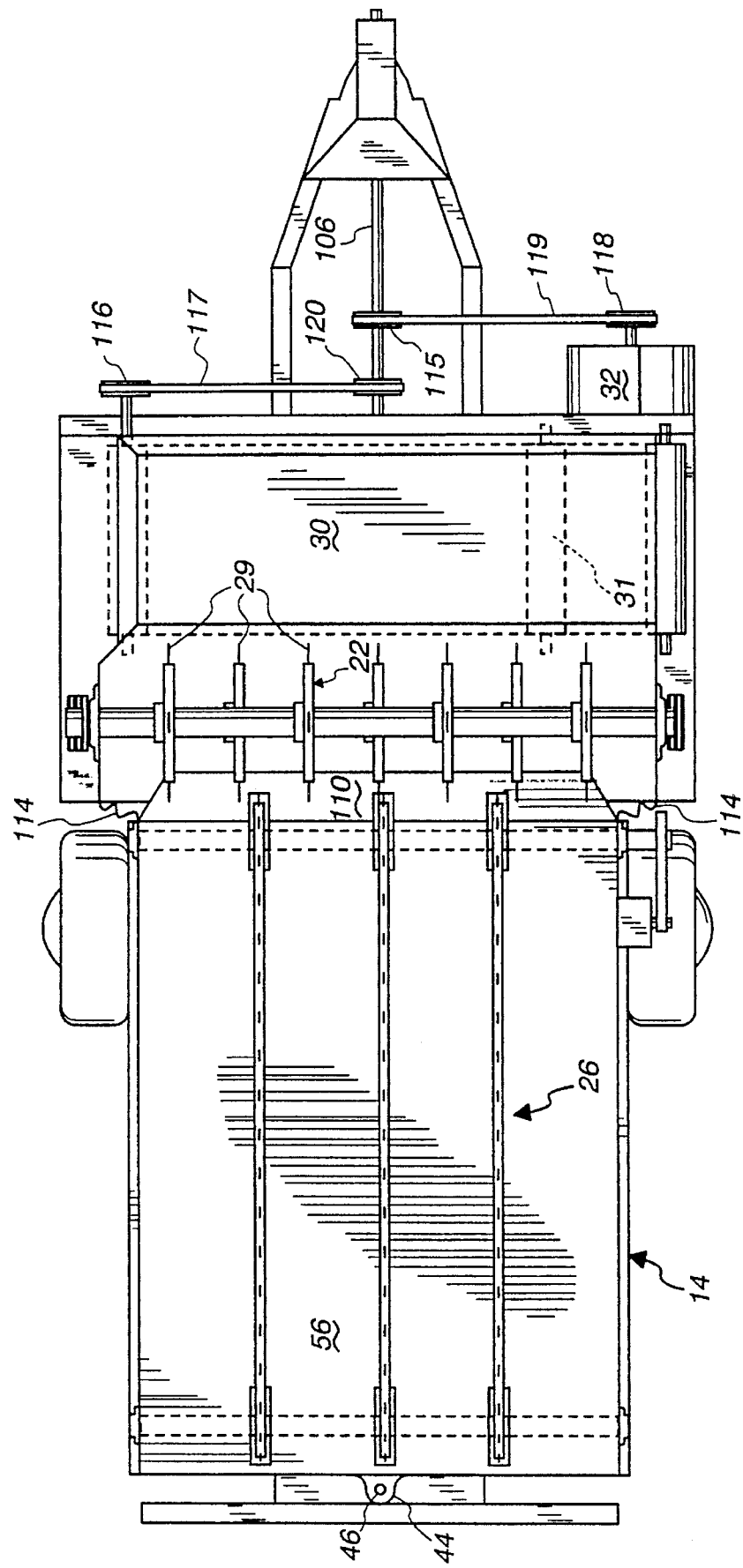
FIG. 4 is a top plan view of the bale shredder shown in FIG. 1.

As seen in FIGS. 1 and 2, the bale shredder 10 is provided with a distributing conveyor 30 mounted on the frame 16 adjacent the cutting rotors 22 for dispensing shredded bale material 13 from one side of the bale shredder 10 during feeding operations. As best seen in FIG. 4, the distributing conveyor 30 may be replaced by a shortened conveyor 31 for feeding shredded bale material 13 to a blower 32 mounted on the frame 16 adjacent the distributing conveyor 31. The blower 32 blows the shredded bale material 13 from the bale shredder 10 through blower opening 33 to dispense the shredded material during landscape mulching operations.

As shown in FIG. 2, the carriage 14 is provided with an elongated, flat, box-shaped frame 34 having two transverse end beams 36 and 38 and two longitudinal side beams 40 and 42. Pivot 18 is mounted to the middle of the end beam 36 and is in the form of a cylindrical sleeve bearing 44 receiving a pivot shaft 46 fixed to and extending upwards from the towable frame 16. Roller plates 48 are mounted to the underside of the box-shaped frame 34 to provide mating surfaces for the rollers 20. Each roller 20 is mounted to the towable frame 16 so that the axle 50 of the roller 20 is perpendicular to an arc swept by the carriage 14 as it oscillates relative to the roller 20.

As best seen in FIG. 1, bale shields 52 and 54 are mounted to the respective side beams 40 and 42 for containing the bale 12 and shredded bale material 13 within the bale shredder 10. A bale table 56 covers the top of the carriage frame 34 for slidably supporting the bale 12 as the bale conveyor 26 moves the bale into the cutting rotors 22.

The bale conveyor 26 is provided with endless drag chains 58 (three being shown) having teeth 60 thereon to engage the bale 12. Sprockets 62 engage the drag chains 58 at either end of the bale table 56 to guide the drag chains 58 in a continuous path over and under the bale table 56. The sprockets 62 are fixed to rotating axles 64 mounted to the box-shaped frame 34 adjacent the end beams 6 and 38.

The carriage 14 is oscillated by a force cylinder 57 mounted between the frame 16 and the box-shaped frame 34. The force cylinder 57 is pivotally mounted on brackets 59 and 61 to apply an oscillating force F tangent to an arc swept by the carriage 14 as it oscillates relative to the force cylinder 57.

Details of the cutting rotors 22 are shown in FIGS. 1 and 3. The cutting rotors 22 are fixed to three parallel, horizontal rotor shafts 24 rotatably mounted to the towable frame 16. The cutting rotors 22 are staggered axially along the rotors shafts 24 to avoid interference with each other as they rotate, and to provide a relatively large cutting zone for engagement with the bale 12. Each cutting rotor 22 has a disk-shaped body 28 with a plurality of sickles or knives 129 fastened to the body 28 and extending radially from the outer periphery of the body 28 to define an outer radius of rotation. Overlap regions 68, shown by phantom lines in FIG. 3, are provided where the outer radius of rotation of the cutting rotors 22 on one rotor shaft 24 radially overlap the outer radius of rotation of the cutting rotors 22 on another rotor shaft 24. This overlap provides a more continuous cutting zone for engagement with the bale 12. Flat, rectangular shaped paddles 70 are fixed to the bottom rotor shaft between the cutting rotors 22 for moving shredded bale material 13 past the cutting rotors 22.

Preferably, the cutting zone defined by the plurality of cutting rotors 22 has a height and width approximately equal to or greater than the dimensions of a standard large bale, thus allowing the bale shredder 10 to shred and dispense a large bale 12 at a relatively high speed by providing a maximum area of engagement with the bale 12. It is preferred that the carriage 14 oscillate the bale 12 over a distance that is at least twice the maximum spacing between any two adjacent cutting rotors 22.

Additionally, the number and spacing of the knives 29 on each cutting rotor 22 may be selectively altered to optimize the bale shredder 10 for any particular bale shredding operation. For example, two oppositely located knives 29 may be fastened to each cutting rotor 22 when longer fibers are desired in the shredded bale material 13, while four equally spaced knives 29 may be fastened to each cutting rotor 22 when shorter fibers are desired in the shredded bale material 13.

The cutting rotors 22 are powered by a power takeoff (PTO) shaft 106 driven by a tow vehicle (not shown). The PTO shaft 106 drives a right angle gearbox 104 mounted to the frame 16. As best seen in FIG. 2, a pulley 90, driven by an output shaft 103 from the right angle gearbox 104, drives the cutting rotors 22 through a series of belts 86 and pulleys 94 fixed to the ends of the rotor shafts 24.

It will be appreciated, that while the cutting rotors 22 shown in the preferred embodiment have proven to be very effective for shredding large bales, other forms of cutters are encompassed by the present invention. For example, vertically driven saw chains, rotating cylinders with blades spaced thereon, or flailing knives could be utilized with the pivoting, oscillating carriage 14 shown in the preferred embodiment. It is also anticipated that any number of rotor shafts 24 may be utilized in the present invention.

As seen in FIGS. 1 and 2, adjustable speed drive 74 is provided for varying the feed rate of the bale 12 by the conveyor 26 into the cutting rotors 22. A force cylinder controller 75 is provided for varying the rate at which the force cylinder 57 oscillates the carriage 14. Further, the rotational speed of the cutting rotors 22 may be adjusted by adjusting the speed of the PTO shaft 106. Thus, the rate at which the force cylinder 57 oscillates the carriage 14, the feed rate of the bale 12 into the cutting rotors 22, and the rotational speed of the cutting rotors 22 may be, either alone or in combination, adjustably varied depending on any of the characteristic of the shredding operation, such as the consistency of the bale, the desired consistency of the shredded bale material 13, and the desired rate of distribution for the shredded bale material 13.

The adjustable speed drives 74 is preferably in the form of hydraulic motor 80 driving an endless chain or belt 84 through a sprocket or pulley 88. The chain or belt 84 drives a sprocket or pulley 92 fixed to the rotating axle 64. A flow control valve (not shown) controls the flow of hydraulic fluid to the hydraulic motor 80.

The force cylinder 57 is preferably in the form of a hydraulic cylinder, and the force cylinder controller 75 is preferably in the form of a servo valve.

Pressurized hydraulic fluid is supplied to the hydraulic motor 80 and the hydraulic cylinder 57 by a hydraulic system contained in the tow vehicle. Appropriate fluid conduits (not shown) provide transfer of hydraulic fluid to and from all of the hydraulic components of the bale shredder 10. Alternatively, pressurized hydraulic may be supplied a hydraulic pump mounted to the towable frame 16 and driven by the PTO shaft 106.

A rotor shield 108 is mounted to the towable frame 16 adjacent the cutting rotors 22, as seen in FIG. 1. The rotor shield 108 contains the shredded bale material 13 within the bale shredder 10 and guides the shredded bale material 13 to the distributing conveyor 30. A side member 111 of the rotor shield 108 prevents the shredded bale material 13 from escaping one side of the distributing conveyor 30. A lower member 112 of the rotor shield 108 prevents shredded bale material 13 from being drawn off of the distributing conveyor 30 by the bottom set of cutting rotors 22. Curved surface 113 is provided on the lower member 112 to prevent shredded bale material 13 from accumulating on lower member 112.

A table shield 110 extends forwardly from the front of the carriage 14 and overlaps the lower member 112 of the rotor shield 108. The table shield 110 and the lower member 112 cooperate to contain the shredded bale material 13 within the bale shredder 10.

Flexible accordion baffles 114 are connected between the bale shields 52 and 54 and the rotor shield 108. The baffles 114 contain the shredded bail material within the bail shredder 10, while allowing for the oscillating motion of the carriage 14 relative to the rotor shield 108.

The distributing conveyor 30 and the blower 32 are powered by the PTO shaft 106. Pulley 115 fixed to the PTO shaft 106 drives the distributing conveyor 30 or the shortened conveyor 31 through endless belt 117 and pulley 116. Pulley 120 fixed to the PTO shaft 106 drives the blower 30 through endless belt 119 and pulley 118. Thus, the speed of the blower 32 and conveyors 30 and 31 may be adjusted by adjusting the speed of the PTO shaft depending on the desired dispensing rate of the shredded bale material 13 from the bale shredder 10. Speed adjustments may also be obtained by changing the relative diameters of pulleys 115 and 116, and pulleys 118 and 120.

It will be understood that the invention may be embodied in other specific forms without departing from the spirit or central characteristics thereof. The present examples, therefore, are to be considered in all respects illustrative and not restrictive, and the invention is not to be limited to the details given herein.

I claim:

1. A bale shredder for shredding a large bale of forage, bedding, or mulching material, the bale shredder comprising:

a frame;

a cutter mounted to the frame for moving with a first cutting action for shredding a bale, the cutter defining a vertically-extending cutting zone;

an oscillating carriage mounted to the frame for oscillating a bale across the cutter to induce a second, additional cutting action on a bale by the cutter; and a horizontally-extending bale conveyor mounted on the carriage for conveying a bale horizontally into the vertically-extending cutting zone.

2. The bale shredder of claim 1 wherein the cutter has a cutting rotor mounted to the frame for rotation about a rotor axis for shredding a bale.

3. The bale shredder of claim 2 wherein the carriage oscillates a bale parallel to the rotor axis.

4. The bale shredder of claim 2 wherein the rotor axis is horizontal and the oscillating carriage oscillates a bale horizontally.

5. The bale shredder of claim 1 further comprising a force cylinder operably connected between the frame and the carriage to oscillate the carriage.

6. The bale shredder of claim 5 further comprising a force cylinder controller operably connected to the force cylinder for varying the rate at which the force cylinder oscillates the carriage.

7. A bale shredder for shredding a large bale of forage, bedding, or mulching material the bale shredder comprising:

an elongated frame having a first end and a second end, with the cutter mounted adjacent the first end;

a cutter mounted to the frame for moving with a first cutting action for shredding a bale;

an oscillating carriage mounted to the frame for oscillating the bale across the cutter to induce a second, additional cutting action on a bale by the cutter;

a pivot adjacent the second end of the frame, pivotally mounting the carriage to the frame; and a plurality of bearings for supporting the carriage as it oscillates about the pivot.

8. The bale shredder of claim 7 wherein the bearings are in the form of elongated rollers, with each roller having an axle mounted to the frame substantially perpendicular to an arc swept by the carriage as it oscillates relative to the roller.

9. A bale shredder for shredding a large bale of forage, bedding, or mulching material, the bale shredder comprising:

a frame;

a cutter mounted to the frame for moving with a first cutting action for shredding a bale;

an oscillating carriage mounted to the frame for oscillating a bale across the cutter to induce a second, additional cutting action on a bale by the cutter;

a bale conveyor mounted on the carriage for conveying a bale into the cutter; and an adjustable speed drive for the bale conveyor, for varying the feed rate of a bale into the cutter.

10. A bale shredder for shredding a large bale of forage, bedding, or mulching material, the bale shredder comprising:

a frame;

a cutter mounted to the frame for moving with a first cutting action for shredding a bale, the cutter having a plurality of elongated rotor shafts mounted to the frame for rotation parallel to each other, each rotor shaft having a disk-shaped cutting rotor fixed thereto;

an oscillating carriage mounted to the frame for oscillating a bale across the cutter to induce an additional cutting action on a bale by the cutter; and a bale conveyor mounted on the carriage for conveying a bale into the cutter.

11. The bale shredder of claim 10 wherein each cutting rotor includes a knife extending radially from an outer periphery of the cutting rotor.

12. A bale shredder for shredding a large bale of forage, bedding, or mulching material, the bale shredder comprising:

a frame;

an elongated rotor shaft mounted to the frame for rotation;

a plurality of cutting rotors fixed on the rotor shaft; and a plurality of paddles fixed between the cutting rotors on the rotor shaft for moving material shredded from the bale past the cutting rotors.

13. The bale shredder of claim 12 further comprising an oscillating carriage mounted to the frame for presenting a bale to the cutting rotors while oscillating the bale across the cutting rotors to shred the bale.

14. A method of shredding a large bale of forage, bedding, or mulching material, the method comprising the steps of:

moving a bale cutting tool in a cutting action to shred a bale;

oscillating the bale relative to the cutting tool to induce an additional cutting action as the cutting tool shreds the bale; and adjusting the rate at which the bale is oscillated depending on a characteristic of the shredding of the bale.

15. A method of shredding a large bale of forage, bedding, or mulching material the method comprising the steps of:

moving a bale cutting tool in a cutting action to shred a bale;

oscillating the bale relative to the cutting tool to induce an additional action as the cutting tool shreds the bale; and moving the bale into the cutting tool as the bale is oscillated to progressively shred the bale; and adjusting at least one of the rate at which the bale is oscillated and the rate at which the bale is moved into the cutting tool depending on a characteristic of the shredding of the bale.

* * * * *